United States Patent

Schur

[11] 4,121,420
[45] Oct. 24, 1978

[54] GRAVITY ACTUATED THERMAL MOTOR

[76] Inventor: George O. Schur, 3775 SW. 108 Ave., Miami, Fla. 33165

[21] Appl. No.: 755,911

[22] Filed: Dec. 30, 1976

[51] Int. Cl.$^2$ .............................................. F03G 7/06
[52] U.S. Cl. ...................................... 60/531; 60/675
[58] Field of Search ................ 60/530, 531, 643, 645, 60/675, 641; 185/4, 27

[56] References Cited

U.S. PATENT DOCUMENTS

| | | | |
|---|---|---|---|
| 3,509,716 | 5/1970 | Avery | 60/531 X |
| 3,941,030 | 3/1976 | Massung | 60/675 X |
| 3,984,985 | 10/1976 | Lapeyre | 60/641 |
| 4,012,911 | 3/1977 | Gulko | 60/531 |
| 4,019,325 | 4/1977 | Murphy | 60/530 X |

*Primary Examiner*—Allen M. Ostrager
*Attorney, Agent, or Firm*—Berman, Aisenberg & Platt

[57] ABSTRACT

A gravity actuated thermal motor which includes a rotor preferably in the form of a ring-shaped annulus which is filled with water. A plurality of collapsible bellows are connected to and extend inwardly from the outer peripheral wall of the annulus into the water-filled chamber. In communication with each of the bellows and extending outwardly from the outer peripheral wall of the annulus are a plurality of refrigerant-containing tanks, one tank being in communication with the interior portion of one bellows. A source of heat in the form of a hot water trough is positioned at the lower portion of the rotor so as to be intercepted by the refrigerant containers upon rotation of the annulus. The vapor produced by the volatile refrigerant expands the bellows and a locking device secures the bellows fully extended on the ascending side of the annulus. An automatic lock release is positioned near the top of the path of travel to release the bellows to enable same to contract during the time that the bellows at the bottom position is expanding. The constantly expanded bellows on the ascending side of the annulus ensures that the water within the annulus remains on the descending side to thereby impart rotary motion to the annulus which may be coupled out via a centrally positioned shaft.

12 Claims, 4 Drawing Figures

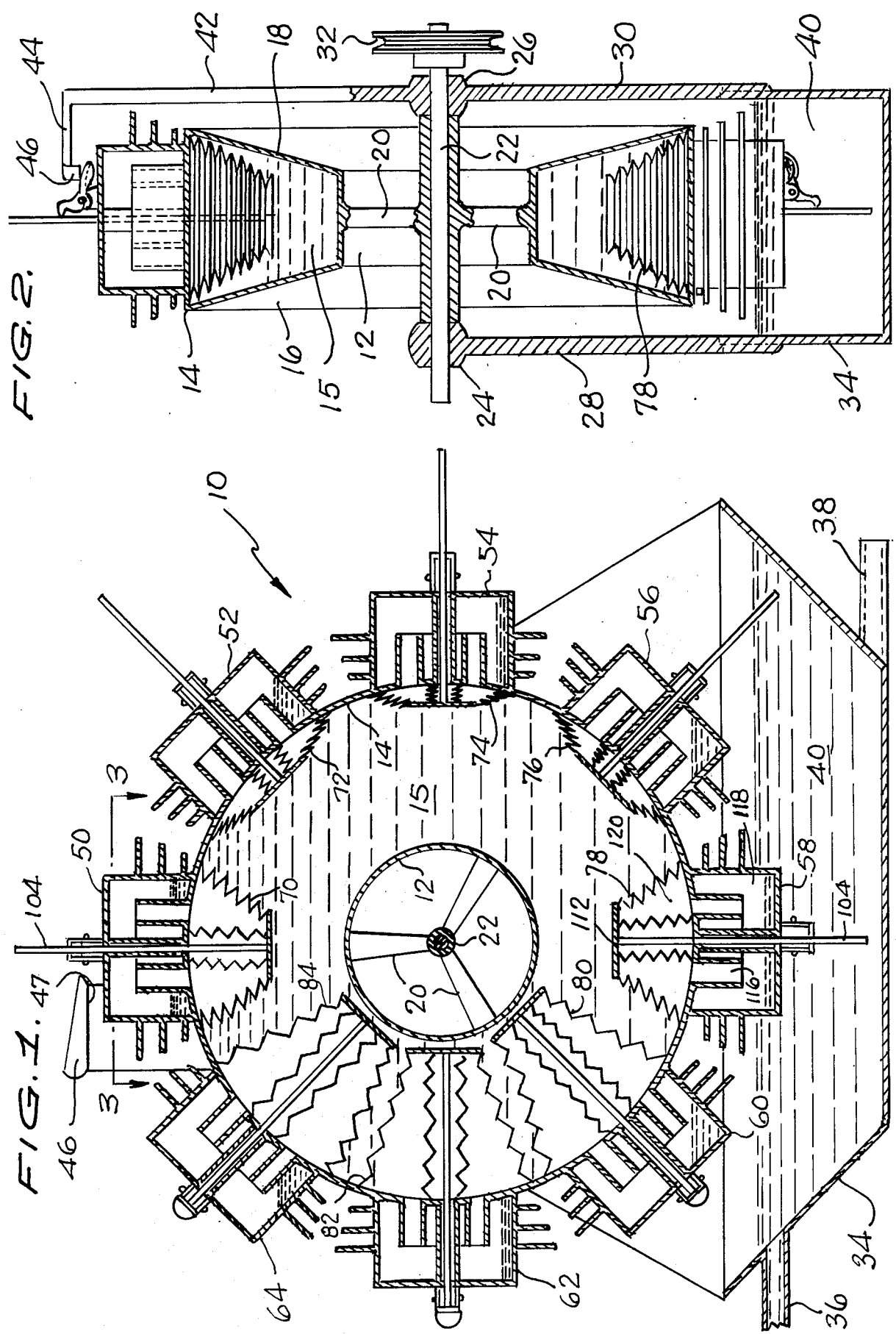

GRAVITY ACTUATED THERMAL MOTOR

BACKGROUND OF THE INVENTION

1. Field of the Invention

The present invention is related to motors which utilize the force of gravity to impart a rotational torque on a rotor and, more particularly, is directed toward a gravity actuated motor of the type described which utilizes as an actuating means the selective expansion and contraction of a vapor from a sealed volatile fluid medium.

2. Description of the Prior Art

The prior art is replete with devices known generally as gravity actuated motors which take advantage of the force of gravity to produce a rotational torque on a rotor. Generally speaking, some means are provided for producing a weight imbalance either in or about the rotor to provide the rotary motion. Such means have been known to take various forms including electrical, mechanical, hydraulic, thermochemical, or the like. Generally speaking, however, such devices have been unduly complex, expensive to produce, mechanically unreliable, inefficient in operation, and prone to mechanical breakdown.

An example of a typical prior art rotary gravity motor is set forth in the U.S. Pat. No. 3,941,030 to Massung in which he utilizes fluid pressure as the means for creating the weight imbalance. More particularly, Massung provides a rotor having a plurality of flexible cells which are arranged in diametrically opposing pairs which are in fluid communication with one another. Each pair of cells contains an amount of liquid sufficient to fill one cell. Fluid pressure is controllably applied to the collapsible cells to force the liquid in the lower cells to their paired counterparts in the upper portion of the rotor to produce the desired torque.

Another type of rotary gravity motor is exemplified by U.S. Pat. No. 3,659,416 to Brown in which a pair of chambers on opposite extremeties of a rotor are in fluid communication with one another through a diametrically extending hollow spoke. The chambers contain an amount of volatile liquid and an electrically-actuated heating element for vaporizing the liquid to force same to move from a lower to an upper chamber to impart the desired torque on the rotor.

Yet another type of rotary gravity motor is illustrated in U.S. Pat. No. 2,513,692 to Tubbs who illustrates a plurality of rotating expansion chambers which are successively dipped into a hot water tank. Each expansion chamber contains a volatile liquid which vaporizes when its associated chamber is immersed in the hot water tank. The vapor causes the chamber in turn to expand, which motion is translated via mechanical linkages to a rotary output motion.

Each of the devices set forth in the foregoing patents is believed deficient in one or more respects which has hindered their widespread adoption and use. For example, the Massung device requires extensive fluid pressure valving and control mechanisms, the Brown device requires electrical energy and heating elements for operation, and the Tubbs structure is dependent upon intricate and maintenance-prone mechanical linkages which also tend to act as an inefficient means for transferring the generated power.

Other U.S. Pat. Nos. of which I am aware which are related to this general art area include: 2,475,343; 2,597,890; 2,601,600; 2,755,619; 3,441,482; and 3,785,144.

OBJECTS AND SUMMARY OF THE INVENTION

It is therefore a primary object of the present invention to provide a rotary gravity motor which overcomes all of the deficiencies noted above with respect to prior art devices.

Another object of the present invention is to provide a rotary gravity motor which utilizes novel thermal means for imparting the weight imbalance necessary to produce the desired rotational torque.

A further object of the present invention is to provide a novel and unique gravity-actuated thermal motor which does not rely upon electrical energy or mechanical linkages for imparting the desired output torque.

A still further object of the present invention is to provide a gravity actuated thermal motor which is practical, easy to construct, may be economically fabricated to be within easy reach of the average consumer, and which requires a minimum of moving parts.

An additional object of the present invention is to provide a novel and unique gravity actuated thermal motor which is of straightforward construction, efficient and effective in operation, and which may be utilized in any of a number of different applications.

The foregoing and other objects are attained in accordance with one aspect of the present invention through the provision of a gravity actuated motor which comprises rotor means having a closed interior chamber which contains a fixed volume of non-volatile fluid, and means movably disposed within the chamber for causing the fluid to be shifted to one side of the chamber for imparting a rotational torque thereto. The fixed volume of fluid preferably fills the closed interior chamber of the rotor, said interior chamber preferably taking the form of a ring-shaped annulus. An output shaft may be connected to the annulus for coupling out the rotary movement thereof.

In accordance with other aspects of the present invention, the means movably disposed within the chamber preferably comprises expansible chamber means in the form of a plurality of bellows disposed about the inner peripheral wall of the ring-shaped annulus. The motor further comprises actuating means for causing the bellows to selectively expand and contract within the chamber to provide the desired fluid-shifting action. In a preferred form, the actuating means comprises tank means disposed exteriorly of the chamber, each of the tanks being in fluid communication with the interior of one of the expansible bellows. Within each of the tanks is a small amount of vapor-producing volatile working fluid. The apparatus further contemplates the provision of a heat source in the form of a hot water trough disposed in the rotating path of the exterior tanks at the bottom portion of the structure.

In accordance with yet other aspects of the present invention, means are also provided which are operatively connected to each of the expansible chambers for locking same when fully expanded. Fixed position means are also provided for automatically releasing the locking means at a particular position of rotation of the annulus. Each of the working fluid-containing tanks also preferably includes means in the form of a cylindrical standpipe for preventing the working fluid from entering the interior of each bellows.

BRIEF DESCRIPTION OF THE DRAWINGS

Various objects, features and attendant advantages of the present invention will be more fully appreciated as the same become better understood from the following detailed description of the present invention when considered in connection with the accompanying drawings, in which:

FIG. 1 is a side-sectional view illustrating a preferred embodiment of the present invention during operation;

FIG. 2 is a cross-sectional view of the preferred embodiment illustrated in FIG. 1;

DETAILED DESCRIPTION OF THE PREFERRED EMBODIMENT

Figure 3:
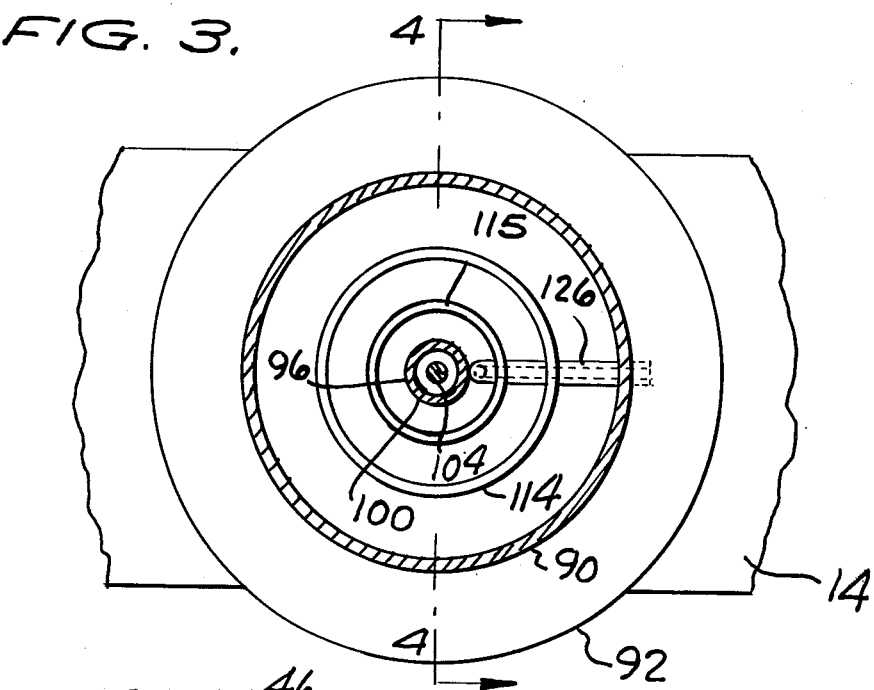
FIG. 3 is an enlarged, sectional view which illustrates in greater detail a preferred component of the present invention illustrated in FIG. 1 and taken along line 3—3 thereof.

Referring now to the drawings, wherein like reference numerals represent identical or corresponding parts throughout the several views, and more particularly to FIGS. 1 and 2 thereof, there is illustrated a preferred embodiment of the gravity actuated thermal motor of the present invention in front and side sectional views, respectively.

The motor of the present invention includes a rotor 10 which is preferably in the form of an enclosed ring-shaped annulus. As illustrated, the annulus or rotor 10 is formed by an inner cylindrical wall 12, an outer concentric cylindrical wall 14, and a pair of side walls 16 and 18 which connect the inner wall 12 and the outer wall 14.

The walls 12, 14, 16 and 18 of the rotating annulus 10 define a closed, fluidtight interior chamber 15 therewithin. Chamber 15 is preferably filled with a nonvolatile, incompressible liquid, such as water.

Extending inwardly from the inner wall 12 of annulus 10 are a plurality of radially disposed strut members 20 which couple the rotor 10 to a central shaft 22. Shaft 22 is journaled in a pair of bearings 24 and 26 which are, in turn, mounted on a pair of support members 28 and 30. Mounted on one end of shaft 22 is any suitable power transmission device, such as a belt sheave 32.

At the bottom portion of rotor 10 is positioned a tank 34 which contains a fluid medium 40 capable of being a source of heat. Typically this fluid is water which has been heated either naturally or by some suitable means. Tank 34 is provided with an inlet 36 and an outlet 38 which serve to supply tank 34 with a suitably heated stream of water. The operation of the present invention depends upon a temperature differential being maintained between the water 40 and ambient. For example, if the ambient temperature is 0° F., the water temperature may be maintained at 40° F. Tank 34 also serves as a base for the support members 28 and 30.

As seen in FIG. 2, extending upwardly from support member 30 is a further support member 42 which has a horizontal member 44 extending transversely from the top portion thereof. Mounted at the distal end of horizontal member 44 is a latch-trip member 46, provided for a purpose which will become more clear hereinafter.

As seen in FIG. 1, positioned about the periphery of outer wall 14 of annulus 10 are a plurality of enclosed, substantially identical containers or tanks 50, 52, 54, 56, 58, 60, 62, and 64. Associated with each of the tanks 50 through 64 and connected to and extending inwardly of outer wall 14 are a plurality of expansible chamber assemblies in the form of bellows 70, 72, 74, 76, 78, 80, 82 and 84, respectively.

Figure 4:
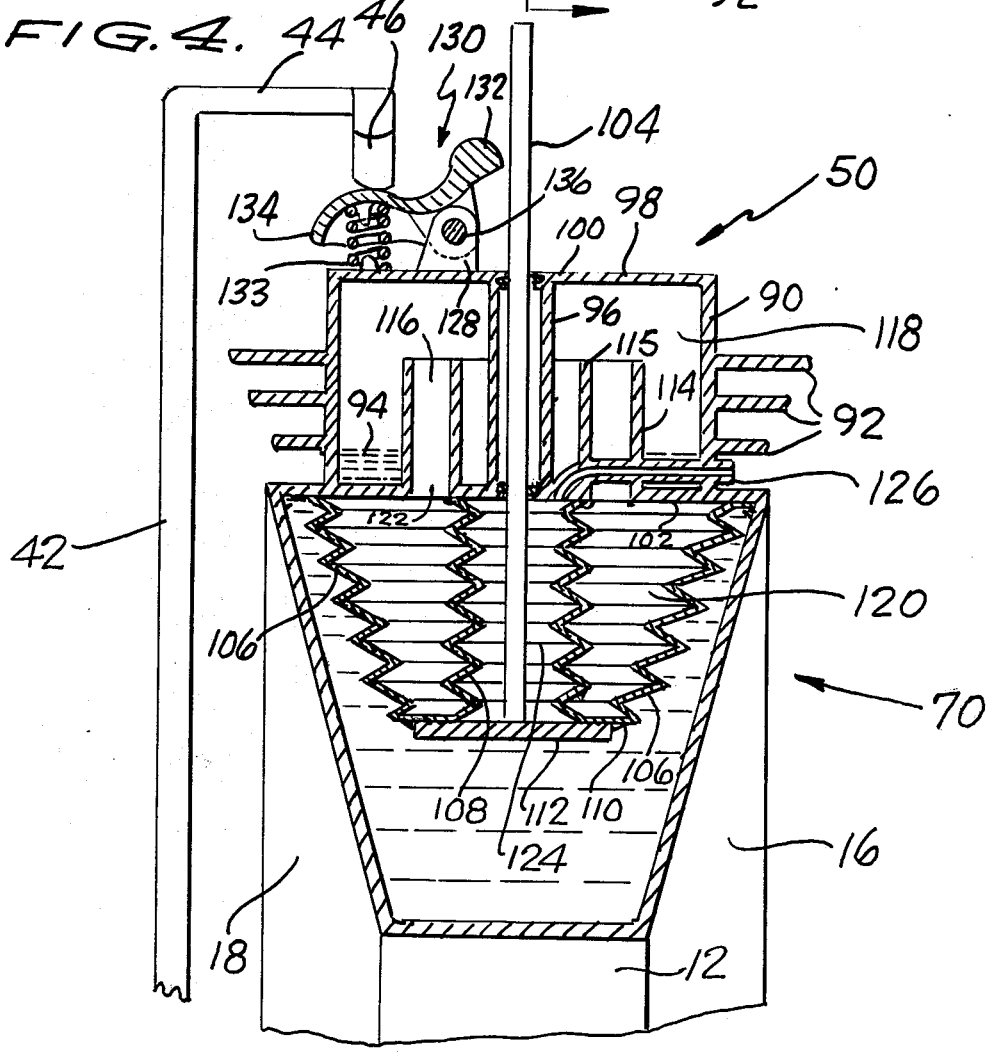
FIG. 4 is a sectional view of the component illustrated in FIG. 3 and taken along line 4—4 thereof.

FIGS. 3 and 4 illustrate in top and sectional views, respectively, the details of construction of the preferred embodiment of one of the tanks 50 and associated bellows 70 of the present invention. The following description of the preferred structure of tank 50 and associated bellows 70 will suffice as a description for the other tank-bellows assemblies, inasmuch as their construction may be substantially identical.

Tank 50 is defined by a substantially cylindrical outer wall 90 and a reduced diameter cylindrical inner wall 96. Provided about the periphery of outer wall 90 are preferably a plurality of ring-like cooling fins 92 which serve to assist in the cooling of the contents of tank 50.

Tank 50 further includes a top wall 98 and a bottom wall 102 each of which has an aperture centrally formed and axially aligned therein. The central apertures in top wall 98 and bottom wall 102 are also coaxial with a longitudinal bore 100 which is defined by the inner wall 96 of tank 50. Extending through bore 100 and the apertures in top and bottom walls 98 and 102 is a rigid rod 104 which is movable vertically as depicted IN FIG. 4, in a manner to be described in more detail hereinafter.

Contained within each tank 50 is a small amount of a volatile liquid or refrigerant 94 which has the property of vaporizing at a known temperature. The particular liquid 94 will be selected for each application depending upon the ambient temperature within which the present invention will be utilized. As stated hereinabove, successful operation of the present invention depends upon a temperature differential between the ambient atmosphere and the heat source 40 in tank 34, the temperature of the latter being sufficient to initiate vaporization of liquid 94 within each tank 50.

Bellows 70 consists of a substantially annular structure which tapers in a conical fashion and includes an outer extensible wall 106, an inner wall 108, and a bottom joining wall portion 110. Walls 106, 108 and 110 are constructed of a fluid impervious material, outer and inner walls 106 and 108 being respectively secured at their upper ends to the bottom surface of wall 102 of tank 50 so as to define an annular, somewhat conical, variable volume chamber 120 within bellows 70. Secured to the bottom wall portion 110 of bellows 70 is a plate member 112 to the center of which one end of rigid rod 104 is firmly attached.

Within tank 50 is positioned a cylindrical ring-like standpipe 114 which extends upwardly from the bottom wall 102 of tank 50. The standpipe outer wall 114 forms, along with inner wall 115, an open conduit 116 which places the interior 118 of tank 50 in fluid communication with the interior 120 of bellows 70 via a ring-like opening 122 formed in the bottom wall 102. Standpipe 114 also serves to prevent the working liquid 94 from entering the interior 120 of bellows 70, in a fashion which will be more appreciated hereinafter.

Reference numeral 124 indicates a substantially cylindrical space bounded by the inner wall 108 of bellows 70 and the bottom plate 112. The space 124 is vented to the ambient atmosphere by means of a vent pipe 126.

Positioned on the top wall 98 of tank 50 is a mounting flange 128 to which is pivotally attached as at 136 a rod-locking device indicated generally by reference numeral 130. The rod-locking device 130 includes a rod-engaging projection or tip 132 which extends integrally from an automatic release portion 134. The device 130 is normally biased in a clockwise fashion about pivot 136 (as viewed in FIG. 4) by means of a spring 133 which extends between the top wall 98 of tank 50 and the underside of release portion 134. In FIG. 4, rod-locking device 130 is illustrated in its rod-release position by virtue of the engagement of latch-trip member 46 with the upper surface of the release portion 134 of lever 130.

Referring back to FIG. 1, the operation of the preferred embodiment of the present invention will now be explained. As stated above, the interior chamber 15 formed by annulus 10 is entirely filled with an incompressible liquid, such as water. Rotational torque is imparted to the annulus 10 by means which ensure that almost all of the weight of the water within container 15 is on the right-hand side (as viewed in FIG. 1) of the closed container 15, thereby imparting a clockwise movement to the rotor or annulus 10.

Maintaining substantially the entire weight of the fluid within container 15 on the descending or right-hand side of rotor 10 is, in turn, achieved by ensuring that those bellows in the positions now occupied by bellows 80, 82 and 84 are fully extended, while those bellows in the positions occupied by bellows 72, 74 and 76 are fully retracted. Those bellows in the positions occupied by bellows 70 and 78 are in a transitional state, bellows 78 being expanded upwardly, while bellows 70 is in the process of retracting.

The foregoing action is achieved in the following manner. As the rotor 10 turns clockwise, the tanks 56, 54 and 52 will successively come in contact with the heat source represented by warm water 40. Tank 58 in FIG. 1 is depicted in its lowermost position in full contact with the heat source 40. Warming of the tanks in turn causes the liquid refrigerant, positioned on the bottom wall of tank 58, to vaporize. Since the vapor of such volatile liquids expands to many times the volume it occupies as a fluid, and since the inner chamber 118 of tank 58 is in fluid communication with the interior chamber 120 of bellows 78 via conduit 116, the vapor pressure will cause the bellows 78 to expand upwardly as viewed in FIG. 1.

Bellows 78 will continue to expand until it is fully extended as indicated by bellows 80, 82 and 84. As bellows 78 expands, rod 104 is drawn with plate 112 until the free end thereof clears the projection 132 of the rod-locking device 130. The biasing spring 133 (FIG. 4) of the device 130 will then cause the rod-engaging projection 132 to lock the rod 104 and, hence, bellows 78 in its fully extended position, such as depicted by bellows 80, 82 and 84.

Thus, the rod-locking device 130 ensures that the bellows 78 will not retract after the tank 58 leaves the hot liquid 40 and begins to cool. At such a time, represented by the present position of tank 60, the refrigerant gas pressure within the bellows and refrigerant tank decays rapidly. The continued, locked expansion of the bellows on the ascending side of rotor 10 ensures that the contents of container 15 will remain on the descending side to provide the required torque.

As the tanks having fully extended bellows rotate past the automatic latch-trip member 46, the latter acts so as to automatically release the rod-locking device 130 and thereby permits the associated bellows to contract. The release is achieved when the upper surface of the release portion 134 of rod-locking device 130 passes and is depressed by the lower edge 47 of latch-trip member 46.

Bellows 70 is not automatically biased so as to retract once its rod 104 has been released by latch-trip member 46. Rather, bellows 70 is caused to retract as a result of the expansion of bellows 78 within a fixed volume, filled container of incompressible liquid 15. In other words, expansion of bellows 78 will cause bellows 70 to simultaneously retract.

Obviously, numerous modifications and variations of the present invention are possible in light of the above teachings. It is therefore to be understood that within the scope of the appended claims, the invention may be practised otherwise than as specifically described herein.

I claim as my invention:

1. A gravity actuated motor, which comprises:
   rotor means having a closed interior chamber which contains a fixed volume of fluid;
   expansible chamber means movably disposed within said chamber for causing said fluid to be shifted to one side of said chamber; and
   actuating means disposed exteriorily of said closed interior chamber and in fluid communication with the interior of said expansible chamber means for causing said expansible chamber means to selectively expand and contract within said closed interior chamber.

2. The gravity actuated motor as set forth in claim 1, wherein said fixed volume of fluid substantially fills said closed interior chamber of said rotor means.

3. The gravity actuated motor as set forth in claim 1, wherein said means disposed exteriorly of said chamber include means for containing a vapor-producing working fluid.

4. The gravity actuated motor as set forth in claim 1, wherein said closed interior chamber rotates about a rotational axis in response to the shifting of fluid within said chamber.

5. The gravity actuated motor as set forth in claim 1, wherein said fluid in said chamber is non-volatile.

6. The gravity actuated motor as set forth in claim 1, wherein said fluid in said chamber is water.

7. The gravity actuated motor as set forth in claim 3, wherein said containing means includes means for preventing said working fluid from entering the interior of said expansible chamber means.

8. A gravity actuated motor, which comprises:
   rotor means having a closed interior chamber which contains a fixed volume of fluid;
   expansible chamber means movably disposed within said chamber for causing said fluid to be shifted to one side of said chamber;
   means for containing a vapor-producing working fluid disposed exteriorly of said chamber and in fluid communication with the interior of said expansible chamber means for causing said expansible chamber means to selectively expand and contract within said chamber; and
   heat source means disposed in the rotating path of said means disposed exteriorly of said chamber.

9. The gravity actuated motor as set forth in claim 8, further comprising means operatively connected to said expansible chamber means for locking same when fully expanded.

10. The gravity actuated motor as set forth in claim 9, further comprising means for automatically releasing said locking means at a particular position of rotation of said chamber.

11. The gravity actuated motor as set forth in claim 10, wherein said expansible chamber means comprises a plurality of bellows, and wherein said containing means comprises a plurality of tanks each of which is in fluid communication with the interior of one of said bellow.

12. The gravity actuated motor as set forth in claim 11, wherein said tanks and associated bellows are disposed about the periphery of said chamber.

* * * * *